United States Patent
Subbiah et al.

(10) Patent No.: US 12,354,041 B2
(45) Date of Patent: Jul. 8, 2025

(54) METHOD AND SYSTEM FOR EFFICIENT NAVIGATION OF INFORMATION RECORDS ON KANBAN BOARD

(71) Applicant: Zoho Corporation Private Limited, Chengalpattu Taluk (IN)

(72) Inventors: Subash Subbiah, Rajakilpakkam (IN); Arun Ray Raymond, Chennai (IN); Guhan Ashok Kumar, Vellore (IN); Raghavan Balchand, Chennai (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 17/699,072

(22) Filed: Mar. 18, 2022

(65) Prior Publication Data
US 2022/0335346 A1    Oct. 20, 2022

Related U.S. Application Data

(60) Provisional application No. 63/163,041, filed on Mar. 18, 2021.

(51) Int. Cl.
G06Q 10/0633    (2023.01)
G06Q 10/0631    (2023.01)
G06Q 10/0637    (2023.01)

(52) U.S. Cl.
CPC . *G06Q 10/0633* (2013.01); *G06Q 10/063114* (2013.01); *G06Q 10/06312* (2013.01); *G06Q 10/0637* (2013.01)

(58) Field of Classification Search
CPC .................................................. G06Q 10/0633
See application file for complete search history.

(56) References Cited

U.S. PATENT DOCUMENTS

| 5,612,719 A | 3/1997 | Beernink et al. |
| 7,020,594 B1 | 3/2006 | Chacon |
| 2012/0017182 A1* | 1/2012 | Bau ..................... G06F 3/04812 715/859 |

(Continued)

OTHER PUBLICATIONS

Cooper, Marjorie J., and Charlene Spoede Budd. "Tying the pieces together: A normative framework for integrating sales and project operations." Industrial Marketing Management 36.2 (2007): 173-182. (Year: 2007).*

(Continued)

*Primary Examiner* — Andre D Boyce
(74) *Attorney, Agent, or Firm* — Ahmann Kloke LLP

(57) ABSTRACT

A method and system to generate a stage overview which is comprised of stages corresponding to buckets containing information records grouped based on a predefined criteria. The stages of the stage overview can be designed based on various criteria, e.g., deal/record value, calendar period, sales funnel stages, and the stages are formed as configured by the user. The stage overview provides an overall visualization of the number of deals or records and cumulative amount in each bucket. The stage overview enables the user to navigate from one bucket to any other stage or a bucket, easily and quickly. The buckets are created and maintained according to the stages and vice versa. A bucket is a collection of information records, deals, or the like. Records that fall under the same stage can be grouped and listed out together under one bucket.

15 Claims, 18 Drawing Sheets

(56) References Cited

U.S. PATENT DOCUMENTS

| | | | | |
|---|---|---|---|---|
| 2013/0006687 A1* | 1/2013 | Knapp | ................. | G06Q 10/101 |
| | | | | 705/7.17 |
| 2013/0006688 A1* | 1/2013 | Knapp | ................. | G06Q 10/101 |
| | | | | 705/7.17 |
| 2013/0007694 A1* | 1/2013 | Knapp | ................... | G06Q 10/10 |
| | | | | 717/103 |
| 2013/0275924 A1* | 10/2013 | Weinberg | ................ | B60K 35/00 |
| | | | | 715/863 |
| 2015/0066582 A1* | 3/2015 | Kimla | ................ | G06Q 30/0201 |
| | | | | 705/7.29 |
| 2016/0188134 A1 | 6/2016 | Azmoon et al. | | |
| 2016/0241676 A1* | 8/2016 | Armstrong | ......... | G06F 16/24568 |
| 2018/0053127 A1* | 2/2018 | Boileau | .............. | G06Q 10/0631 |
| 2019/0370755 A1* | 12/2019 | Bartels | .................. | G06F 3/0484 |
| 2020/0005241 A1* | 1/2020 | Westwood | ..... | G06Q 10/063114 |
| 2021/0081366 A1* | 3/2021 | Madisetti | .............. | G06F 16/176 |

OTHER PUBLICATIONS

Parveen, M. and Rao, T.V.V.L.N. (2009) 'An integrated approach to design and analysis of lean manufacturing system: a perspective of lean supply chain', Int. J. Services and Operations Management, vol. 5, No. 2, pp. 175-208. (Year: 2009).*
Nicholson, "Zoho CRM Free Version 2021 Full Introduction, New User And Setup Training Tutorial", YouTube, Nov. 18, 2020.
International Search Report and Written Opinion for corresponding International Application No. PCT/2022/021047, mailed Jul. 14, 2022, 10 Pages.

* cited by examiner

METHOD AND SYSTEM FOR EFFICIENT NAVIGATION OF INFORMATION RECORDS ON KANBAN BOARD

BACKGROUND

Existing methods to navigate through buckets in kanban board have a lot of limitations. Moving deals or records across stages is a regular process in sales, in order to close the deals or records efficiently. Existing method makes it difficult to address movement across buckets. Holding an object and traversing across buckets is painful and there are high changes of dropping the record in the wrong bucket. There is no pictorial representation for visualization of the overall perspective of the number of records and the cumulative amount in each bucket. There are no easy options to close a deal or record.

SUMMARY

Described is a method and system to generate a stage overview which is comprised of stages corresponding to buckets containing information records grouped based on a predefined criteria. The stages of the stage overview can be designed based on various criteria e.g., deal/record value, calendar period, sales funnel stages. The stage overview provides an overall visualization of the number of deals or records and cumulative amount in each bucket. The stage overview enables the user to navigate from one bucket to any other stage or a bucket, easily and quickly. The stages may be formed as configured by the user. The buckets are created and maintained according to the stages and vice versa.

A bucket is a collection of information records, deals, or the like. A bucket can be populated with details like record value or deal amount, record or deal closing date, contact name, to name a few examples. Records that fall under the same stage can be grouped and listed out together under one bucket. The stages may be formed as configured by the user.

In a specific implementation, buckets are arranged on a kanban view area of a kanban board. In a specific implementation, the kanban board displays a collection of buckets placed adjacent to each other on Kanban view area; each stage on the stage overview is mapped with a bucket on the kanban board.

In a specific implementation, scrolling to a desired stage in the stage overview (in another scenario, scrolling and selecting with stylus pen or direct finger input a desired stage) will cause the bucket corresponding to that stage to be displayed in the kanban view area. By way of example, for sales managers this perspective view helps in planning the sales flow. In a scenario, if there are more sales deals or records stacked in early stages of sales funnel, the Manager can add more sales representatives to nurture the records. In yet another scenario, if there are more sales deals or records in the negotiation stage, the Sales Manager will look into offering a discount/offer in order to close sales deals quicker.

In a specific implementation, drag & drop of deals or records from a bucket on the kanban board to a desired stage on stage overview itself is facilitated. In effect the deals or records are moved into the bucket that maps or corresponds to the desired stage. This technique provides a quick and efficient alternative to the process of navigating through the buckets and dropping the records or deals into intended bucket and avoids the inefficient and time-consuming navigating/scrolling through the buckets in order to reach the intended bucket.

In a specific implementation, navigation through the buckets is accomplished using a stylus pen or direct finger input on touchscreens. For example, records can be moved from one bucket to either "won" or "lost" stages on the stage overview just by recognizing the handwritten input marked on a touchscreen with a stylus pen or finger. A simple "Tick" mark gesture marked by user on a record can be captured and recognized to ensure that the record is moved to "won" stage on the stage overview. In another case, a "wrong" mark gesture marked on a record is captured and recognized to ensure that the record is moved to "lost" stage on the stage overview. The last performed action can also be revoked by double tapping on the touch screen using the stylus pen or even a direct finger input. In an example scenario, when a sales manager prefers to move one sales deal or record from one of the sales buckets on a sales kanban board to "won" stage on stage overview, performs a "tick" mark gesture using stylus pen or finger input on the desired record. The tick mark gesture on the desired record implies that the sales deal or record is closed. If the sales manager prefers to move one sales deal or record from one of the sales buckets on a sales kanban board to "lost" stage on stage overview, performs a "wrong" mark gesture using stylus pen or finger input on the desired record. The wrong mark gesture on the desired record implies that the sales deal or record is deleted. In a specific implementation, the user is allowed to select multiple records from bucket(s) to be moved to either "won" or "lost" stage, respectively.

BRIEF DESCRIPTION OF THE DRAWINGS

FIG. 12 depicts a screenshot mock up of a stage overview within a sales funnel.

FIGS. 15A and 15B respectively depict dragging a record in Kanban and dropping a record in stage overview.

DETAILED DESCRIPTION

Figure 1:
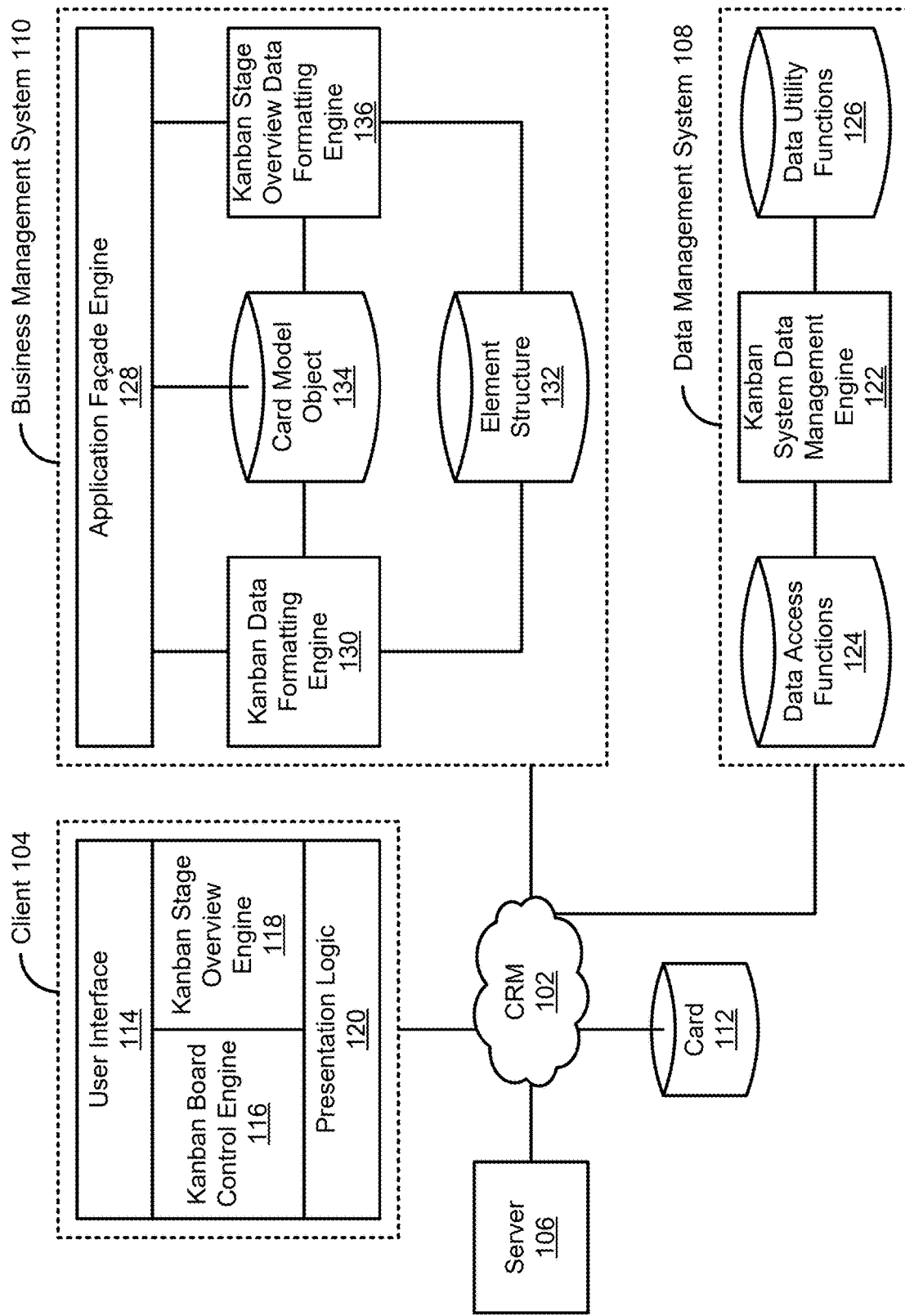
FIG. 1 depicts a diagram of an example of a framework for kanban system with stage overview.

FIG. 1 depicts a diagram 100 of an example of a framework for kanban system with stage overview. The diagram 100 includes a network 102, a client 104 coupled to the network 102, a server 106 coupled to the network 102, a data management system 108 coupled to the network 102, a business management system 110 coupled to the network 102, and a card datastore 112 coupled to the network 102. In a specific implementation, the client 104 includes the data management system 108, the business management system 110 and a user interface (UI) control engine.

The network 102 is intended to include all mediums that are statutory (e.g., in the United States, under 35 U.S.C. 101), and to specifically exclude all mediums that are non-statutory in nature to the extent that the exclusion is necessary for a claim that includes the network to be valid.

The network 102 and other networks discussed in this paper are intended to represent a variety of potentially applicable technologies. For example, the network 102 can be used to form a network or part of a network. Where two components are co-located on a device, the network 102 can include a bus or other data conduit or plane. Where a first component is co-located on one device and a second component is located on a different device, the network 102 can include a wireless or wired back-end network or LAN. The network 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Business process management (BPM), as used in this paper, is a technique intended to align organizations with the needs of clients by continuously improving processes. BPM is an advantageous implementation because it tends to promote business efficacy while striving for innovation and integration with technology. It should be noted that business process modeling and business process management are not the same, and, confusingly, share the same acronym. In this paper, business process management is given the acronym BPM, but business process modeling is not given an acronym. Business process modeling is often, though not necessarily, used in BPM. Business process modeling is a way of representing processes in systems or software. The models are typically used as tools to improve process efficiency and quality, and can use Business Process Modeling Notation (BPMN) or some other notation to model business processes.

A business process, as used in this paper, is a collection of related tasks that produce a service or product for a particular client. Business processes can be categorized as management processes, operational processes, and supporting processes. Management processes govern the operation of a system, and include by way of example but not limitation corporate governance, strategic management, etc. Operational processes comprise the core business processes for a company, and include by way of example but not limitation, purchasing, manufacturing, marketing, and sales.

Supporting processes support the core processes and include, by way of example but not limitation, accounting, recruiting, technical support, event organization, etc.

A business process can include multiple sub-processes, which have their own attributes, but also contribute to achieving the goal of the super-process. For example, an operational process could include an event organization task. (Event organization is sometimes referred to as "event management," but "organization" is used here to avoid confusion with a "management" sub-process.) The analysis of business processes typically includes the mapping of processes and sub-processes down to assignment level. A business process is sometimes intended to mean integrating application software tasks, but this is narrower than the broader meaning that is frequently ascribed to the term in the relevant art, and as intended in this paper. Although the initial focus of BPM may have been on the automation of mechanistic business processes, it has since been extended to integrate human-driven processes in which human interaction takes place in series or parallel with the mechanistic processes.

Referring once again to the example of FIG. 1, in the diagram 100, the client 104 includes a user interface 114, a kanban board control engine 116, a kanban stage overview engine 118, and presentation logic 120. As used here, the "client" aspect of the client 104 is in relation to the "server" aspect of the server 106. As would be recognized by one of skill in the relevant art, a device that acts as a client in one context can act as a server in another context.

The user interface 114 is intended to represent input devices, output devices, and the logic necessary to drive such devices; in a specific implementation, this includes a user interface (UI) control engine. The specifics of the input and output devices that comprise the user interface 114 depend upon the device that is being used as a client. However, it is generally desirable, given the nature of the technology involved, to include at least a screen suitable for displaying a kanban board. While not specifically required, if the user interface 114 includes a touchscreen input device, certain techniques described in this paper become available to the user. If a touchscreen is implemented, a touchscreen controller of the user interface 114 recognizes gesture actions from interaction with the user interface 114 using, for example, a stylus pen or finger; the touchscreen controller passes the gesture actions to the kanban board control engine 116 and/or the kanban stage overview engine 118 for interpretation and action.

The kanban board control engine 116 is intended to represent hardware, typically including software implemented in the hardware to cause the hardware to act as a specifically programmed device in accordance with the software. The device need not have all applicable software implemented at the same time; it can swap out portions of software as the need arises. For example, the device can rely upon cloud services to carry out certain functionality. The function of the kanban control engine 116 is described below.

The kanban stage overview engine 118 is intended to represent hardware, typically including software implemented in the hardware to cause the hardware to act as a specifically programmed device in accordance with the software. The device need not have all applicable software implemented at the same time; it can swap out portions of software as the need arises. The function of the kanban stage overview engine 118 is described below.

The presentation logic 120 is intended to represent hardware, typically including software implemented in the hardware to cause the hardware to act as a specifically programmed device in accordance with the software. The device need not have all applicable software implemented at the same time; it can swap out portions of software as the need arises. The presentation logic 120 provides graphical data and information associated with a kanban system to the user interface 114 for consumption by a user. The presentation logic 120 provides updates made in the stage overview and kanban board to the user interface 114 when they occur.

The server 106 is intended to represent hardware, typically including software implemented in the hardware to cause the hardware to act as a specifically programmed device in accordance with the software. The device need not have all applicable software implemented at the same time; it can swap out portions of software as the need arises. In a specific implementation, the server 106 includes, application server functionality, web hosting server functionality, database access server functionality, or a combination of these, and acts in accordance with a server-client relationship vis-à-vis the client 104 over the network 102.

The data management system 108 includes a kanban system data management engine 122, a data access functions datastore 124 coupled to the kanban system data management engine 122, and a data utility functions datastore 126 coupled to the kanban system data management engine 122. The data management system 108 may or may not be implemented on the same device as the client 104.

The kanban system data management engine 122 is intended to represent hardware, typically including software implemented in the hardware to cause the hardware to act as a specifically programmed device in accordance with the software. The device need not have all applicable software implemented at the same time; it can swap out portions of software as the need arises. In a specific implementation, the data access functions datastore 124 and the data utility functions datastore 126 provide the kanban system data management engine 122 simplified access to information records. For example, to generate a stage overview the kanban system data management engine 122 pulls information records from a DBMS at the server 106. In a specific implementation, the kanban system data management engine 122 stores the information records in local memory, though remote (e.g., cloud-based) storage could also be utilized if, for example, on-device resources are constrained.

The business management system 110 includes an application façade engine 128, a kanban data formatting engine 130 coupled to the application façade engine 128, an element structure datastore 132 coupled to the kanban data formatting engine 130, a card model object datastore 134 coupled to the application façade engine 128 and the kanban data formatting engine 130, and a kanban stage overview data formatting engine 136 coupled to the application façade engine 128 and the element structure and card model object datastores 132, 134. The business management system 110 may or may not be implemented on the same device as the client 104 and/or the data management system 108.

The application façade engine 128 is intended to represent hardware, typically including software implemented in the hardware to cause the hardware to act as a specifically programmed device in accordance with the software. The device need not have all applicable software implemented at the same time; it can swap out portions of software as the need arises. The function of the application façade engine 128 is described below and can generally be characterized as including the kanban data formatting engine 130 and the kanban stage overview data formatting engine 136.

The kanban data formatting engine 130 decides upon logic behind the mapping of records into corresponding bucket(s). The kanban data formatting engine 130 decides total number of buckets based on the number of stages created by the kanban stage overview data formatting engine 136.

The element structure datastore 132 is intended to represent a datastore of business components, entity components, structural design of basic elements like bucket design, information record holder, or card design, to name a few examples.

The card model object datastore 134 includes details of records; logic in the kanban data formatting engine 130 and the kanban stage overview data formatting engine 136 is used for manipulating this data.

The kanban stage overview data formatting engine 136 includes logic or a filter that decides the number of stages and elements of stages based on filters like record/deal values, calendar date, or stages of sales funnel, to name a few examples.

In an example scenario to generate stages of a sales funnel based on user preference, the kanban data formatting engine 130 generates a bucket for each stage, as provided by the kanban stage overview data formatting engine 136, and map records to corresponding buckets in the kanban board. Stages are updated as records are mapped to the buckets. Next, stage overview is generated with accumulated stages. The application façade engine 128 provides this data to the presentation logic 120.

Figure 2A:
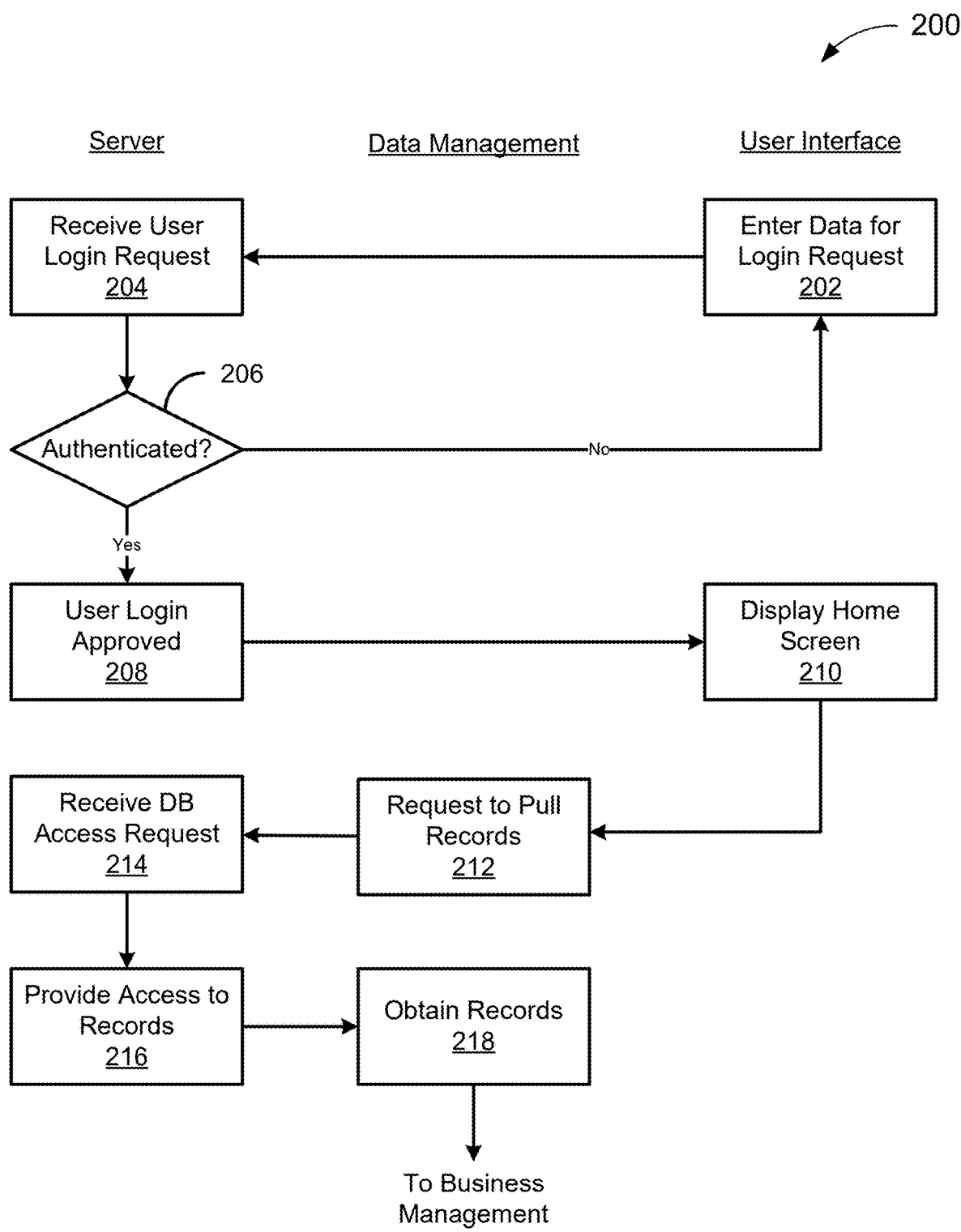
FIGS. 2A and 2B depict a flowchart of an example of a process flow for creating a stage overview on a kanban system.
Figure 2B:
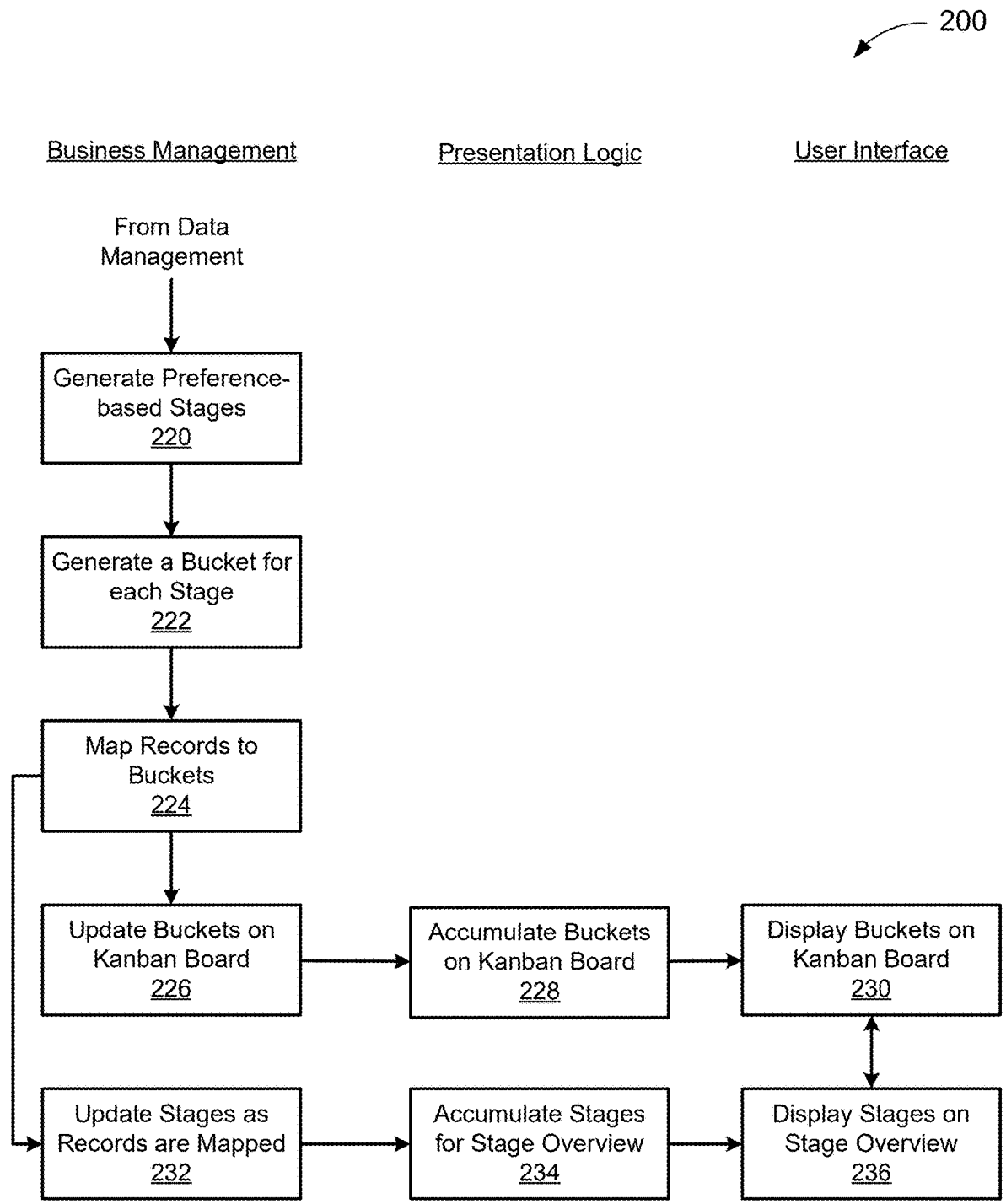

FIGS. 2A and 2B depict a flowchart 200 of an example of a process flow for creating a stage overview on a kanban system. The flowchart 200 and other flowcharts described in this paper include modules and decision points that can be omitted, done in a different order than indicated, and/or reordered for parallel execution, if applicable. The flowchart 200 includes columns labeled server, data management, user interface, business management, and presentation logic, which correspond to a server, such as the server 106, a data management system, such as kanban system management engine 122 of the data management system 108, a user interface, such as the user interface 114, a business management system, such as application façade engine 128 of the business management system 110, and presentation logic, such as the presentation logic 120, as described in FIG. 1.

The flowchart 200 starts at module 202 with a user entering data for a login request at the user interface. The flowchart 200 continues to module 204 with receiving the user login request at the server. At decision point 206, it is determined whether the user is authenticated. If it is determined the user is not authenticated (204—No), the flowchart 200 returns to module 202. Otherwise, if it is determined the user is authenticated (204—Yes), the flowchart 200 continues to module 208 where the user login is approved at the server.

The flowchart 200 continues to module 210 with the home screen being displayed at the user interface and to module 212 where a request to pull records is made from the data management system. It may be noted that the request to pull records could be triggered by the server after user login is approved (208), without any test for whether module 210 has occurred.

The flowchart 200 continues to module 214 where the request to pull records is received as a database access request at the server. It may be noted that the request to pull records could be obviated via a push that provides applicable records without a request from the data management system if the server is aware of the records that are desired.

The flowchart 200 continues to module 216 with providing access to records at the server and to module 218 where the data management system obtains the relevant records. In a specific implementation, the server includes a DBMS that provides the records via a network connection. In an alternative, the server provides an identification of relevant records that the data management system can use to obtain the records from an applicable datastore.

The flowchart 200 continues to module 220 where stages are generated based on user preferences, to module 222 where a bucket is generated for each stage, and to module 224 where records are mapped to buckets, all at the business management system. From module 224, two paths are presented, starting respectively at module 226 and module 232. In a specific implementation, the two paths are followed in parallel. In an alternative, one path could be followed before the other.

With that in mind, the flowchart 200 continues to module 226 where buckets are updated on the kanban board at the business management system, to module 228 where buckets are accumulated on the kanban board at the presentation logic, and to module 230 where buckets on the kanban board are displayed at the user interface.

The flowchart 200 also continues to module 232 where stages are updated as records are mapped at the business management system, to module 234 where stages are accumulated for stage overview at the presentation logic, and to module 236 where stages are displayed on stage overview at the user interface.

Because, in a specific implementation, a user can switch between kanban board and stage overview, the modules 230 and 236 are coupled together with a double arrow, which is intended to represent switching back an forth between the displays. The flowchart could return to a previous module (not shown), e.g., to update buckets (226) or update stages (232) if additional records are obtained or in response to changes to made by the user.

Figure 3:
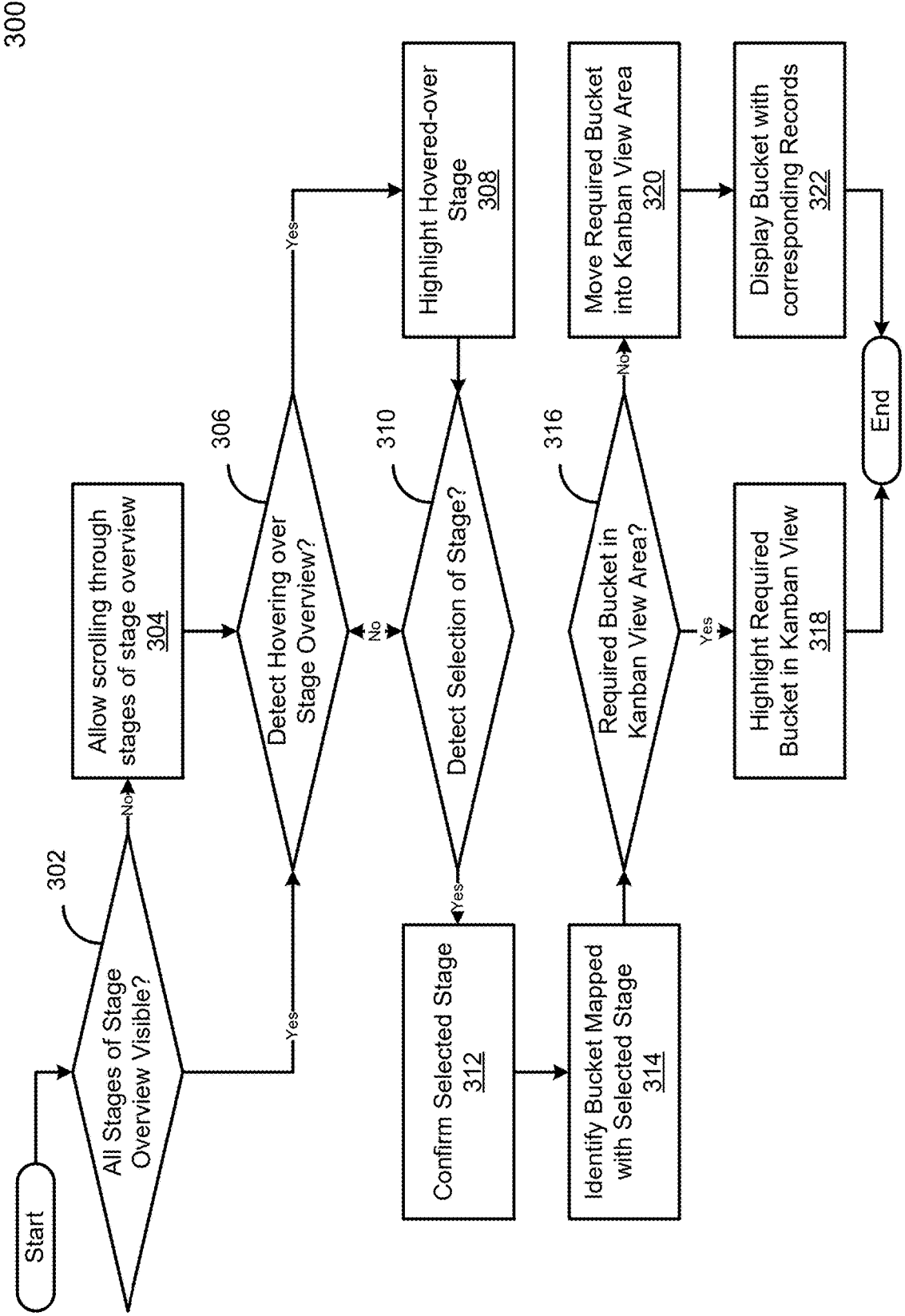
FIG. 3 depicts a flowchart of an example of a method to scroll or navigate between stages through stage overview and displaying desired bucket on kanban view area.

FIG. 3 depicts a flowchart 300 of an example of a method to scroll or navigate between stages through stage overview and displaying desired bucket on kanban view area. The modules and decision points of the flowchart can be executed using presentation logic, such as the presentation logic 120, of FIG. 1. Any indication that a user provides input or is provided a display would utilize a user interface, such as the user interface 114 of FIG. 1, passing through a kanban board control engine, such as the kanban board control engine 116 of FIG. 1. Use of stage overview also implicates a kanban stage overview engine, such as the kanban stage overview engine 118 of FIG. 1. The flowchart 300 starts at decision point 302 where it is determined whether all stages of the stage overview are visible. If not (302—No), the flowchart continues to module 304 where scrolling through stages of the stage overview is allowed. This enables a user to view all the stages of the stage overview even if some are not initially visible.

Figure 11:
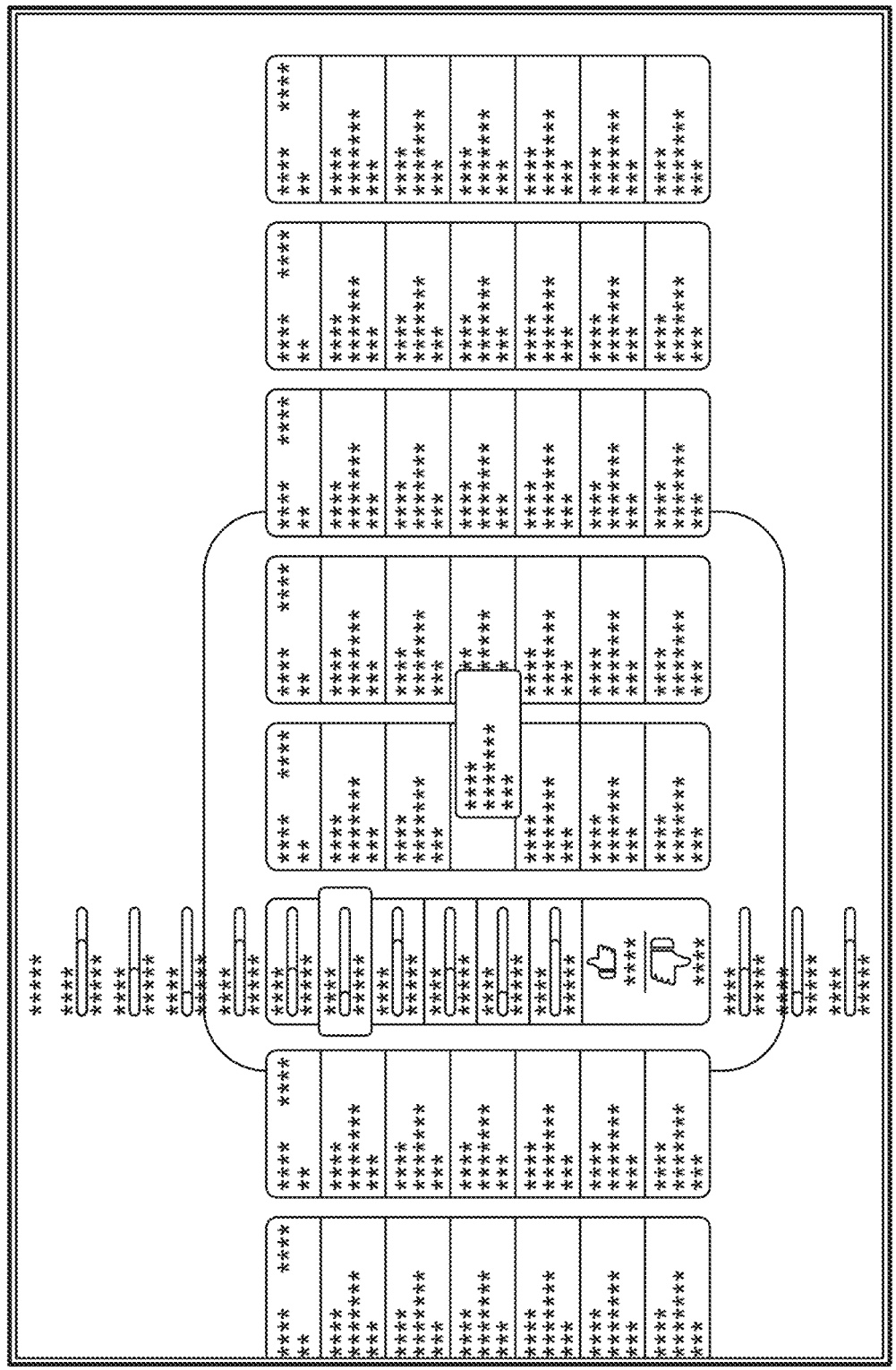
FIG. 11 depicts a screenshot mock up of number of stages and buckets in kanban area and kanban view area.

FIG. 11 depicts a screenshot mock up of number of stages and buckets in kanban board and kanban view area. In a specific implementation, the stages in a stage overview are positioned horizontally, vertically, top, bottom, left, right and between the buckets within the kanban view area. The kanban board comprises one or more buckets; the buckets are a collection of information records. The buckets are held by kanban board. Records that fall under the same stage are grouped and listed out together under one bucket.

The stage overview is a collection of stages such that each stage corresponds to a bucket holding a set of records. The stages in stage overview are displayed in a cumulative manner and positioned at an edge of the user interface in the display unit, wherein the edge position includes the left edge, or right edge. In a specific implementation the stage overview is positioned at the middle of the user interface. The remaining area of the user interface is called "kanban view area". The kanban view area displays a predefined number of buckets from kanban board, by default based on the size of the display unit. Generally, as the user scrolls or navigates through the buckets, the buckets displayed on the kanban view area keep on changing along the scrolling or navigation direction. When a user selects a stage on the stage overview, the corresponding bucket and its records are displayed on the kanban view area. This essentially reduces the scrolling or navigation time required to reach the desired bucket as the user can view the records in the desired bucket just by selecting the corresponding stage on the stage overview.

Referring once again to the example of FIG. 3, if it is determined all stages of the stage overview are visible (302—Yes), or in any case after module 304, the flowchart 300 continues to decision point 306 where it is determined whether hovering is detected over the stage overview. If hovering is detected over the stage overview (306—Yes), then the flowchart 300 continues to module 308 with highlighting the hovered-over stage. The stage on which the user is currently hovering, is highlighted both for visual appeal and as a navigation aid.

If hovering is not detected over the stage overview (306—No) or in any case after module 308, the flowchart 300 continues to decision point 310 where it is determined whether a stage selection has been detected. In a specific implementation, if a user has selected a desired stage by a "single tap" action using a stylus pen or finger on a touchscreen, then the bucket that corresponds to the selected stage is identified. If stage selection has not been detected (310—No), the flowchart returns to decision point 306 and continues as described previously. If stage detection has been detected, the flowchart 300 continues to module 312 where selection of the stage is confirmed.

The flowchart 300 continues to module 314 where a bucket mapped with a selected stage is identified and to decision point 316 where it is determined whether the required bucket (based on the selection) is in the kanban view area. The kanban view area displays a predefined number of buckets to the user. In a specific implementation, the kanban view area displays two buckets at a time such that the first bucket is placed adjacent to the stage overview and the second bucket follows the first bucket.

If it is determined the required bucket is in the kanban view area (316—Yes), the flowchart 300 ends at module 318 where the required bucket is highlighted in kanban view. In a specific implementation, if the user selects a stage corresponding to the first bucket (which is adjacent to the stage overview), then the first bucket is highlighted to make it visually impressive and notify the user. For example, suppose if the user selects a stage corresponding to the second bucket (which is away from stage overview), then the second bucket is just highlighted for user convenience but not moved adjacent to the stage overview.

If, on the other hand, it is determined the required bucket is not in the kanban view area (316—No), the flowchart continues to module 320 where the required bucket is moved into the kanban view area and ends at module 322 where the bucket and corresponding records are displayed. In this way, the bucket corresponding to the stage selected by the user is moved to the kanban view area and displayed to the user. In an alternative, if the identified bucket is not within the kanban view area, then the bucket corresponding to the stage selected by the user, is moved to the kanban view area, is positioned adjacent to the stage overview. The selected bucket is placed adjacent to the stage overview and it is followed by next bucket corresponding to the stage next to the selected stage, on the stage overview. This ultimately enhances user experience as the bucket corresponding to the selected stage will always appear adjacent to the stage overview. By default, in both the embodiments if the user selects the last or ultimate stage in the stage overview, then the penultimate bucket (corresponding to the penultimate stage) is displayed adjacent to the stage overview, and the last bucket is displayed following the penultimate bucket.

As used here, the end of the flowchart signifies a user has found what is desired; the flowchart could, of course, resume at some earlier decision point or module for further navigation.

In an alternative, the bucket corresponding to the stage selected on the stage overview, is displayed at the farthest end from the stage overview. The space between the stage overview and the desired bucket, is filled with the bucket(s) which correspond to the stage(s) before the selected stage. The stage overview acts as a shortcut to reach any bucket as required by the user. This method avoids unnecessary scrolling or navigating through all the buckets to view a required bucket. Thereby reducing the scrolling or navigation time highly. In a specific implementation, the bucket corresponding to the stage selected by the user, is highlighted while being displayed to the user. This enhances the visual perception of the user so that the user can easily identify the particular bucket in the kanban view area, without any difficulties.

Figure 4:
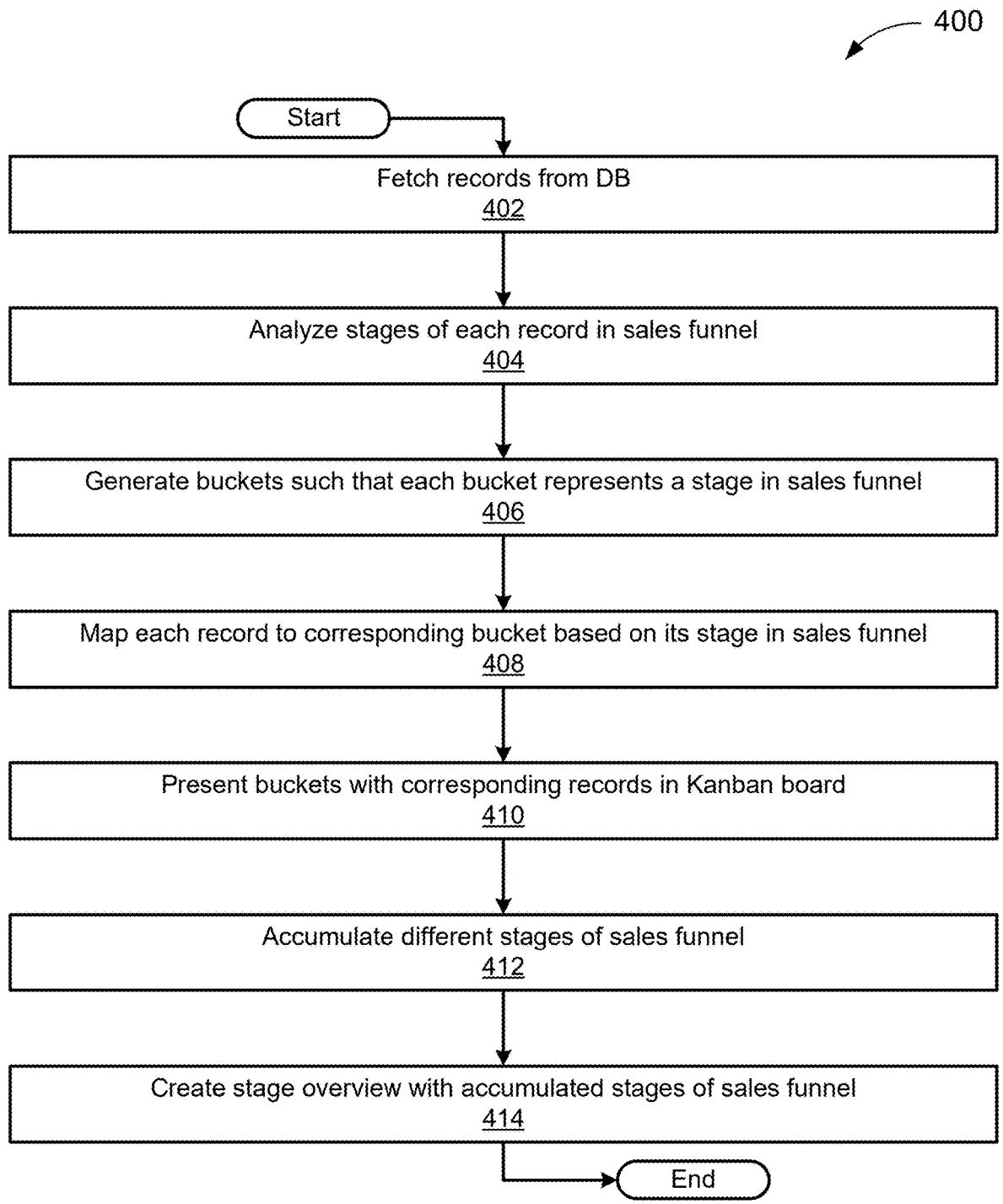
FIG. 4 depicts a flowchart of an example of a method to create a stage overview with stages of a sales funnel.

FIG. 4 depicts a flowchart 400 of an example of a method to create a stage overview with stages of a sales funnel. The flowchart 400 starts at module 402 with fetching records from a datastore (see FIG. 2). The flowchart 400 continues to module 404 with analyzing stages of each record in a sales funnel and to module 406 with generating buckets such that each bucket represents a stage in the sales funnel.

Figure 12:
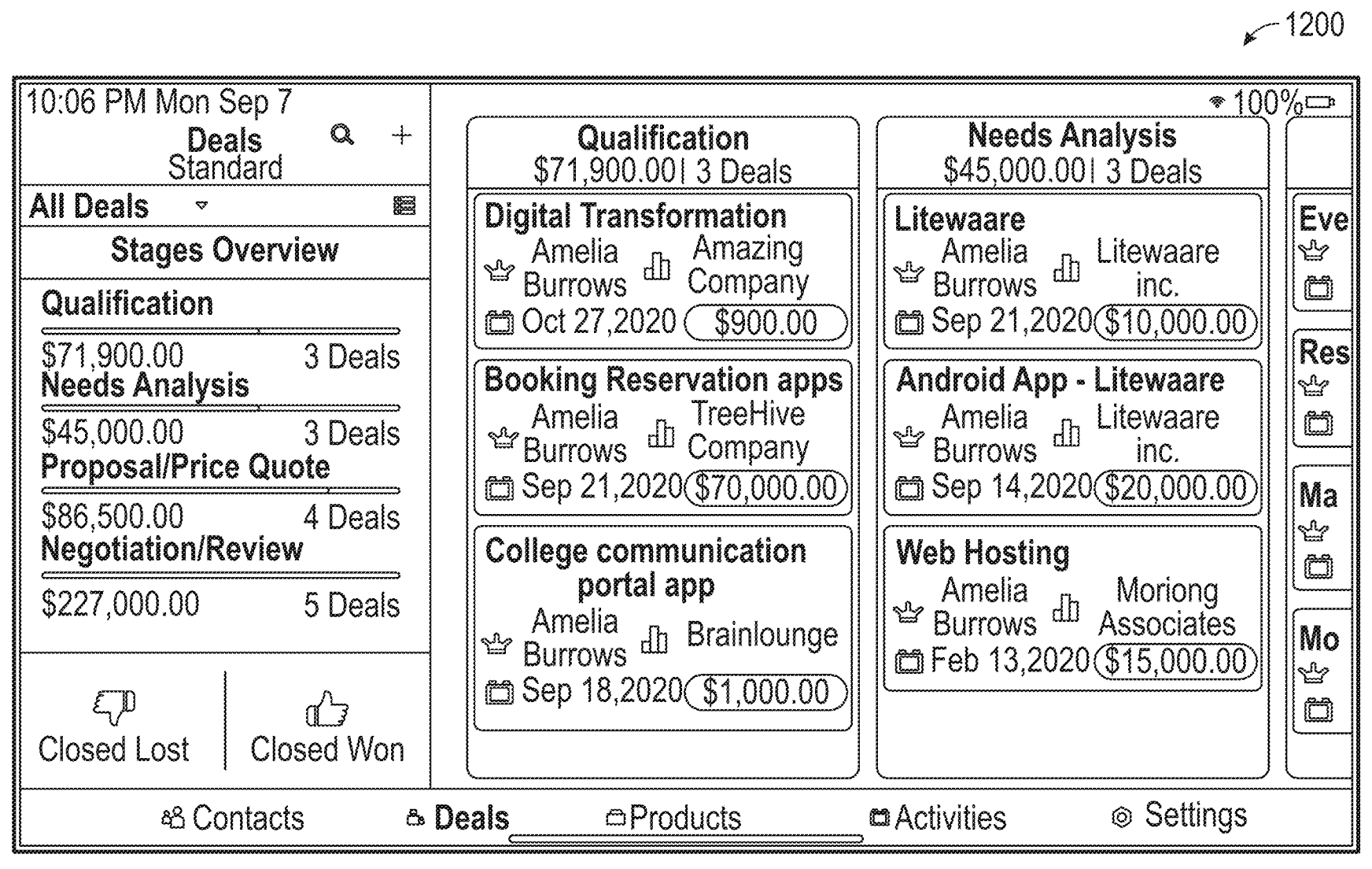

FIG. 12 depicts a screenshot mock up of a stage overview within a sales funnel. The mock up illustrates by way of example but not limitation data relevant to a sales tunnel, such as dates, amounts, stages of deals, wins and losses, and the like. In this example, stages can include qualification, needs analysis, proposal/price quote, and negotiation/review.

Referring once again to the example of FIG. 4, the flowchart 400 continues and to module 408 with mapping each record to a corresponding bucket based on its stage in the sales funnel and to module 410 with presenting buckets with corresponding records in kanban board. For example, a predefined number of buckets are displayed on the kanban view area of the kanban board.

The flowchart 400 continues to module 412 with accumulating different stages of the sales funnel and ends at module 414 where a stage overview is created with accumulated stages of the sales funnel. In a specific implementation, different stages of the sales funnel are accumulated simultaneously.

Figure 5:
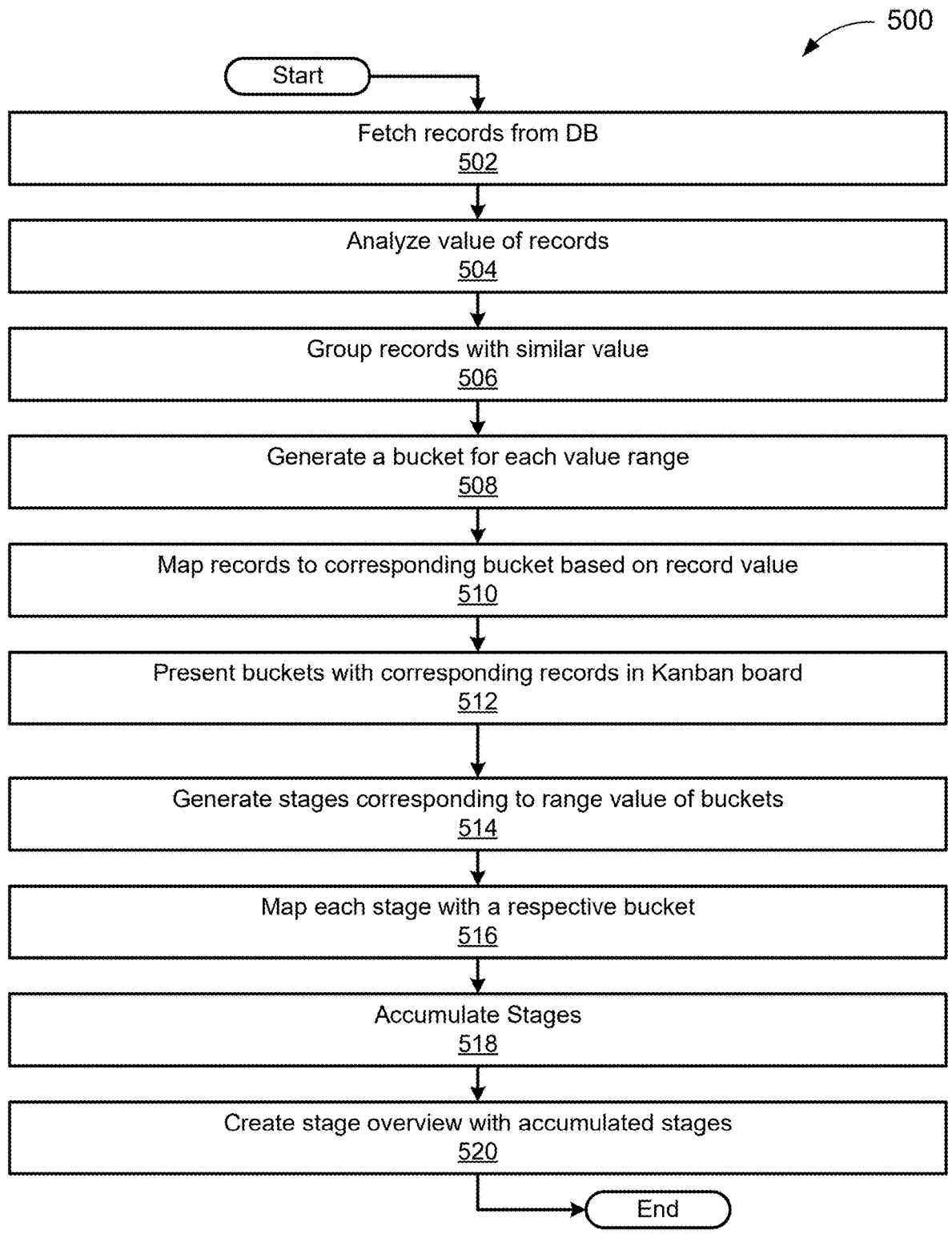
FIG. 5 depicts a flowchart of an example of a method to create a stage overview with stages based on record value.

FIG. 5 depicts a flowchart 500 of an example of a method to create a stage overview with stages based on record value. The method can be used to create a stage overview with accumulated stages based on value of deal or record. The flowchart 500 starts at module 502 with fetching records from a datastore (see FIG. 2). The flowchart 500 continues to module 504 with analyzing value of records, to module 506 with grouping records with similar value, to module 508 with generating a bucket for each value range, to module 510 with mapping records to corresponding bucket(s) based on record value, and to module 512 with presenting buckets with corresponding records in kanban board. Records falling within specific value ranges are grouped together and mapped to a corresponding bucket such that the bucket holds records that fall between a particular value range. In a specific implementation, a predefined number of buckets are displayed on kanban view area of kanban board.

Figure 13:
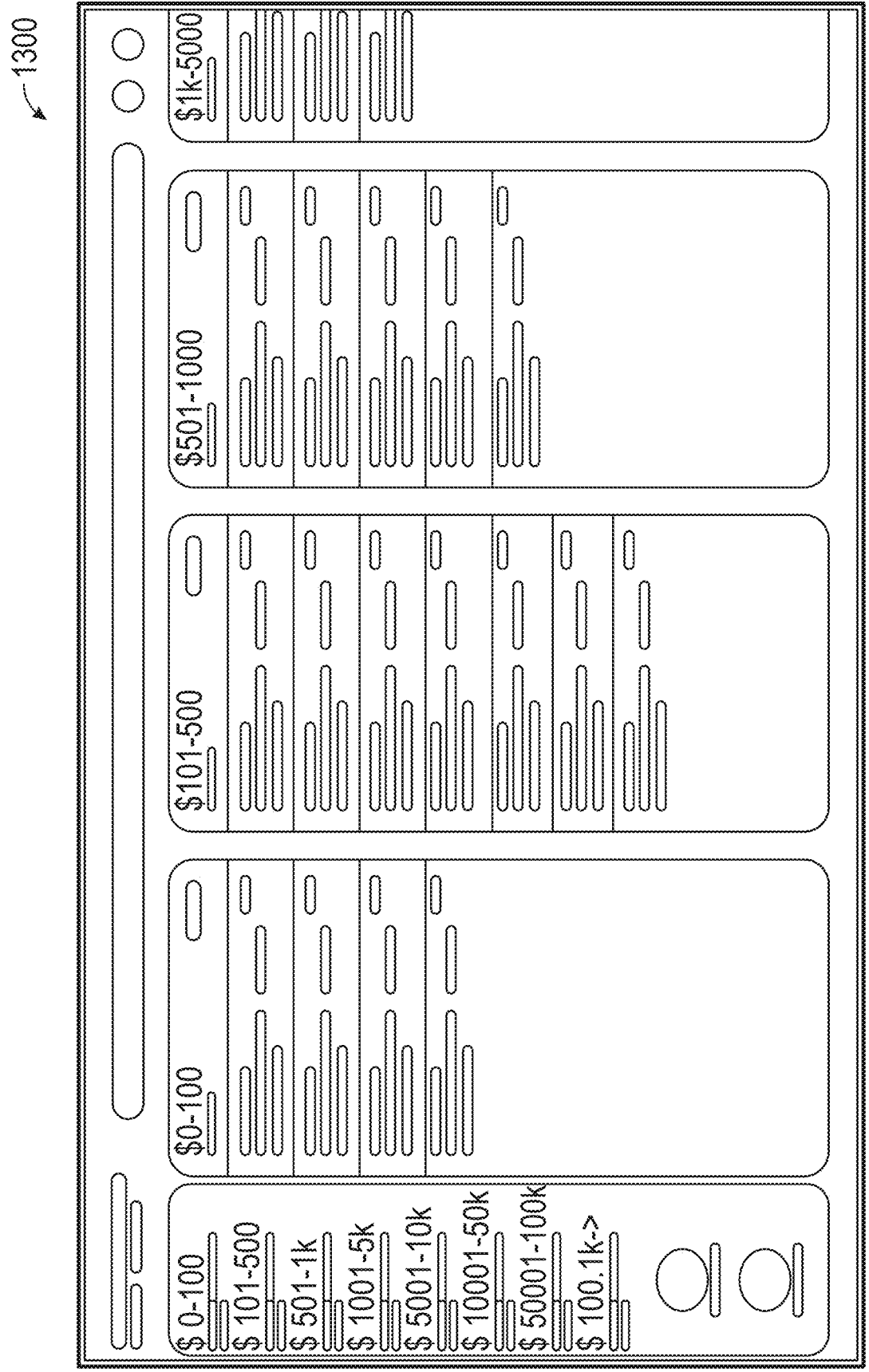
FIG. 13 depicts a screenshot mockup of stage overview with stages based on record value.

FIG. 13 depicts a screenshot mockup of stage overview with stages based on record value. No mockup details are included other than to illustrate each stage has a different value range; in this example, they are $0-100, $101-500, $501-1000, $1 k-5000, . . . .

Referring once again to the example of FIG. 5, the flowchart 500 continues to module 514 with generating stages corresponding to range value of buckets, to module 516 with mapping each stage with a respective bucket, and to module 518 with accumulating stages. In a specific implementation, stages are generated simultaneously corresponding to the value range of the buckets.

The flowchart 500 ends at module 520 with creating a stage overview with accumulated stages. In a specific implementation, the stage overview is created with accumulated stages based on their value range. In an example scenario, the accumulated buckets in stage overview are segmented as high value records, mid value records and low value records based on record value ranges (<1000$, 1000-100 k$ . . . etc.). The buckets will have information about the records in various stages of the sales process.

Figure 6:
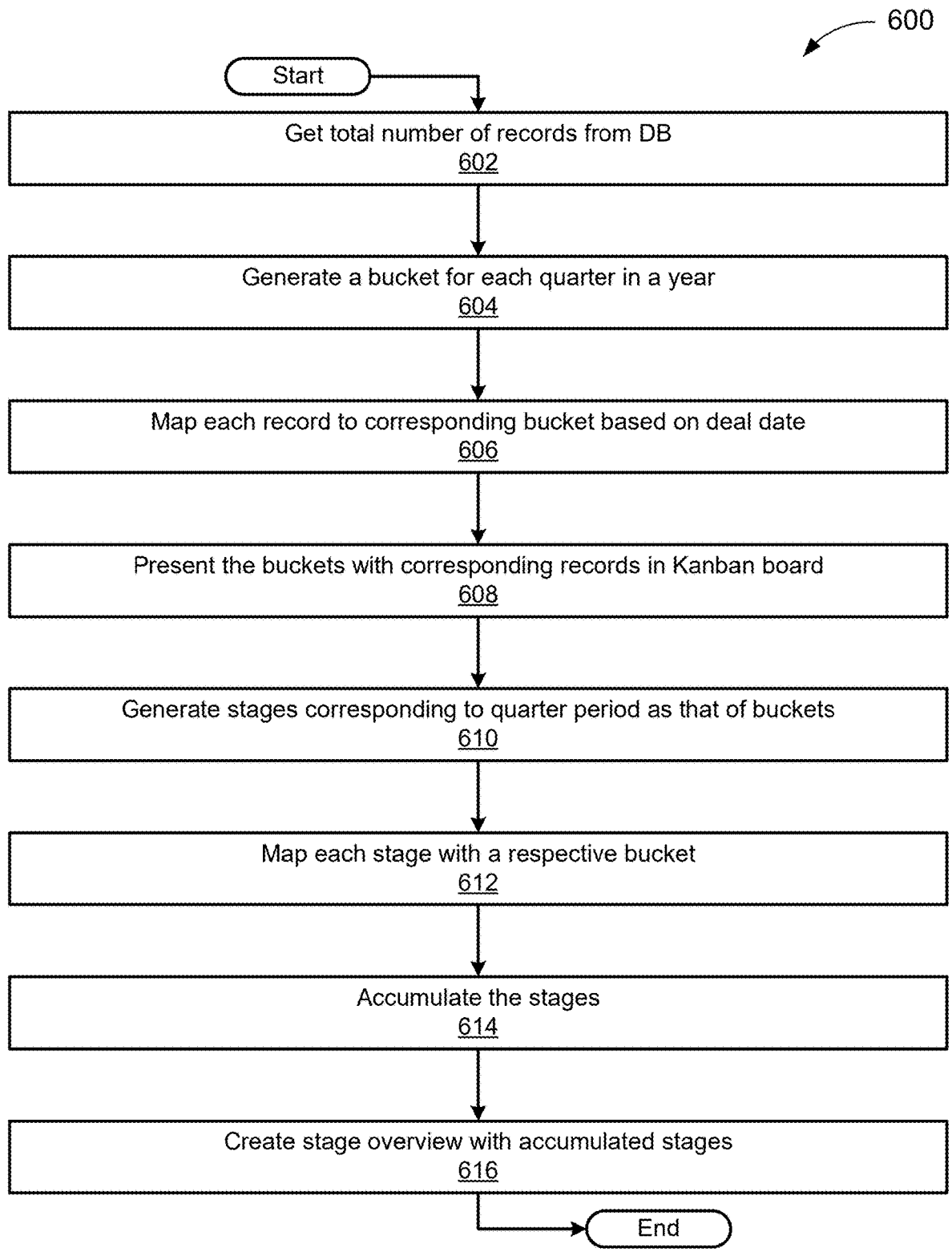
FIG. 6 depicts a flowchart of an example of a method to create a stage overview with stages based on calendar.

FIG. 6 depicts a flowchart 600 of an example of a method to create a stage overview with stages based on calendar. The flowchart 600 starts at module 602 with getting a total number of records from a datastore. (See FIG. 2.)

The flowchart 600 continues to module 604 with generating a bucket for each quarter in a year, to module 606 with mapping each record to a corresponding bucket based on deal date, to module 608 with presenting the buckets with corresponding records in kanban board, to module 610 with generating stages corresponding to quarter period as that of buckets, to module 612 with mapping each stage with a respective bucket, and to module 614 with accumulating the stages. In a specific implementation, stages are generated simultaneously corresponding to the calendar period of the buckets.

Figure 14:
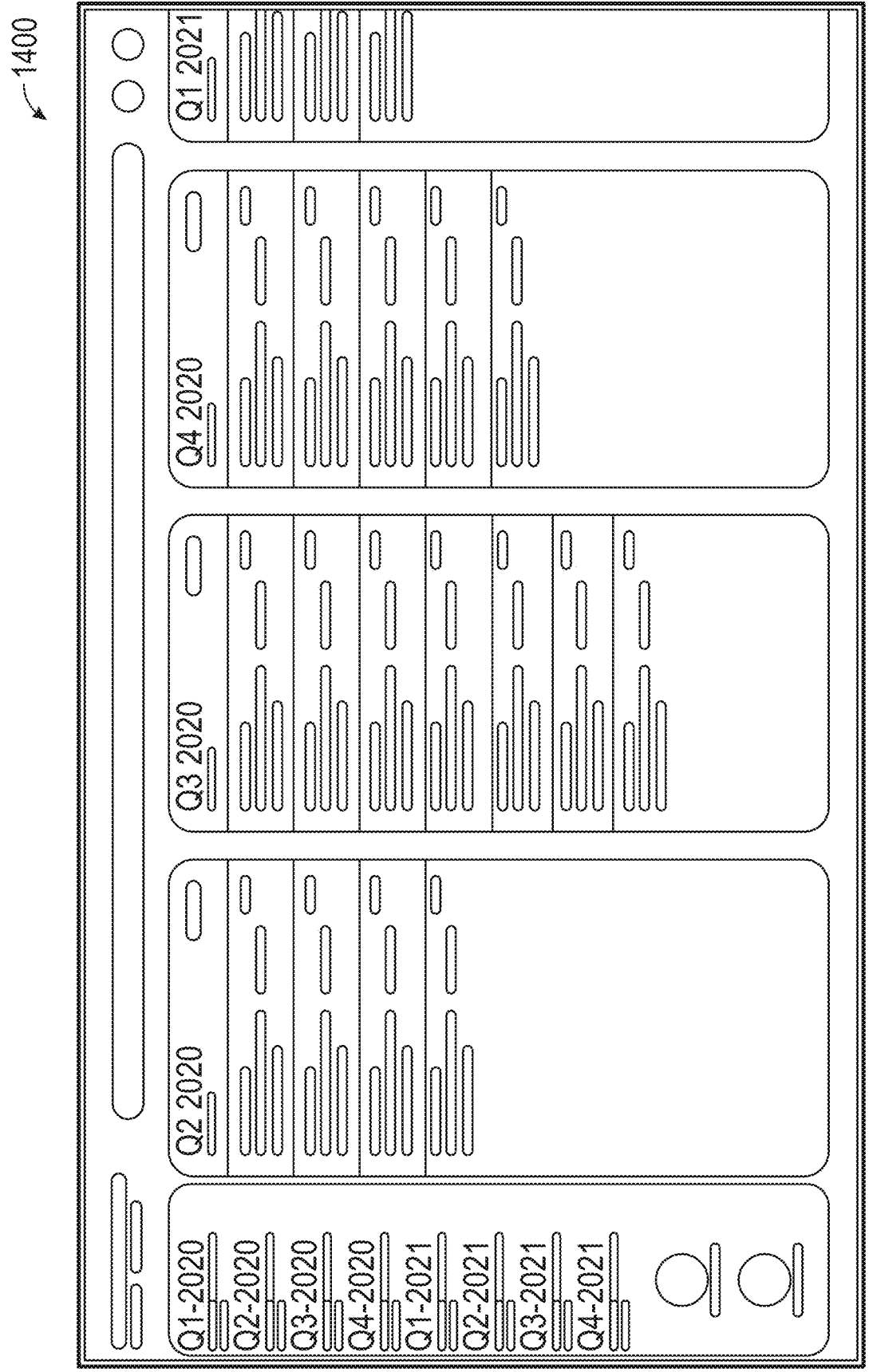
FIG. 14 depicts a screenshot mock up of a stage overview with stages based on calendar.

FIG. 14 depicts a screenshot mock up of a stage overview with stages based on calendar. In a specific implementation, Stage overview can also be designed based on due date of records for each month in a calendar year. In an example scenario, the stage overview helps to view the revenue in pipeline for the upcoming months.

Referring back to the example of FIG. 6, the flowchart ends at module 616 with creating stage overview with accumulated stages.

Figure 7A:
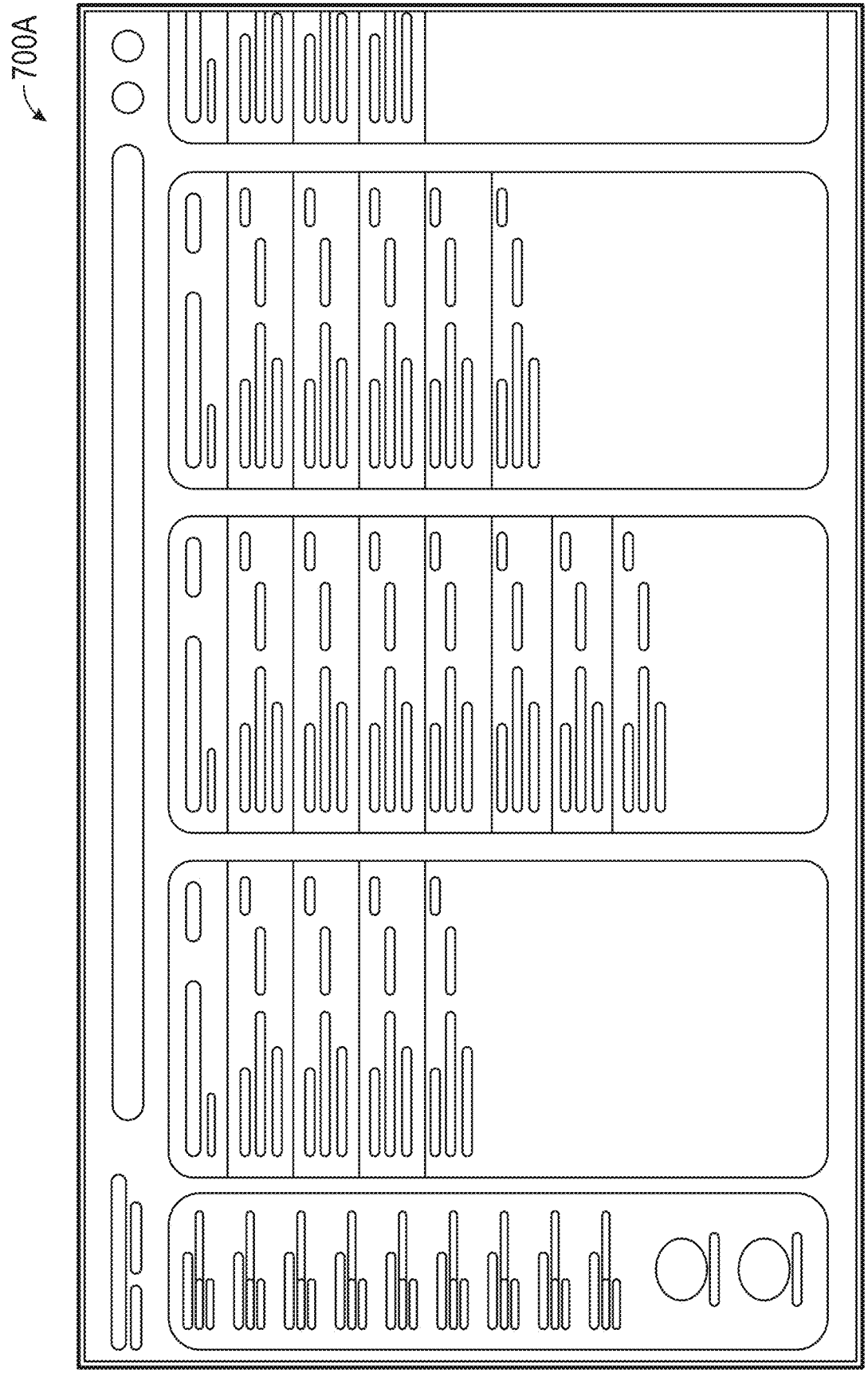
FIGS. 7A and 7B respectively depict screenshot mockups intended to illustrate stage overview positioned at right and left.
Figure 7B:
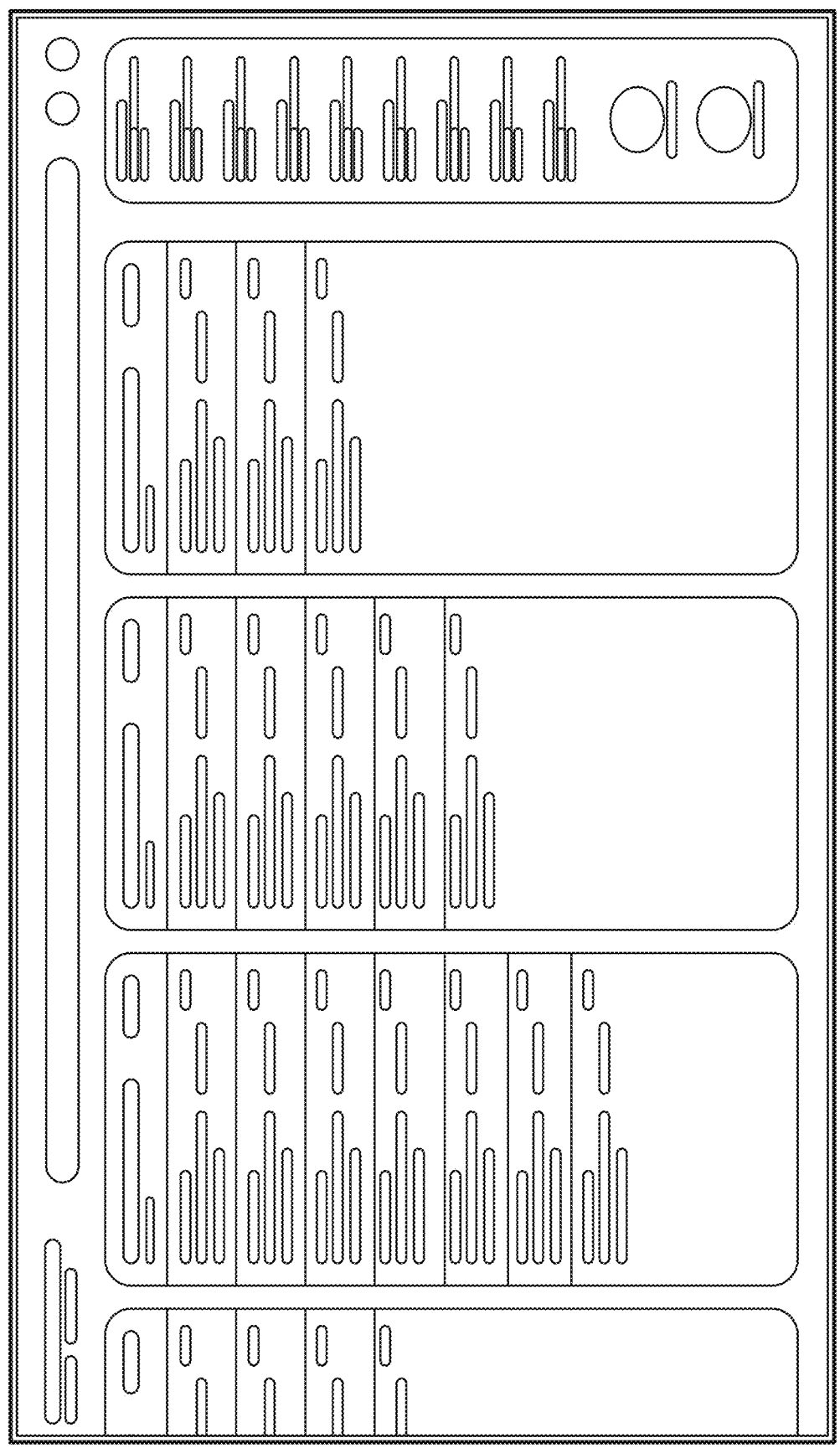

FIGS. 7A and 7B respectively depict screenshot mockups intended to illustrate stage overview positioned at right and left. Stage overview can be placed vertically and moved to leftmost or rightmost positions in the user interface. It can also be placed in the middle of the user interface. The stage overview can also be placed horizontally.

Figure 8:
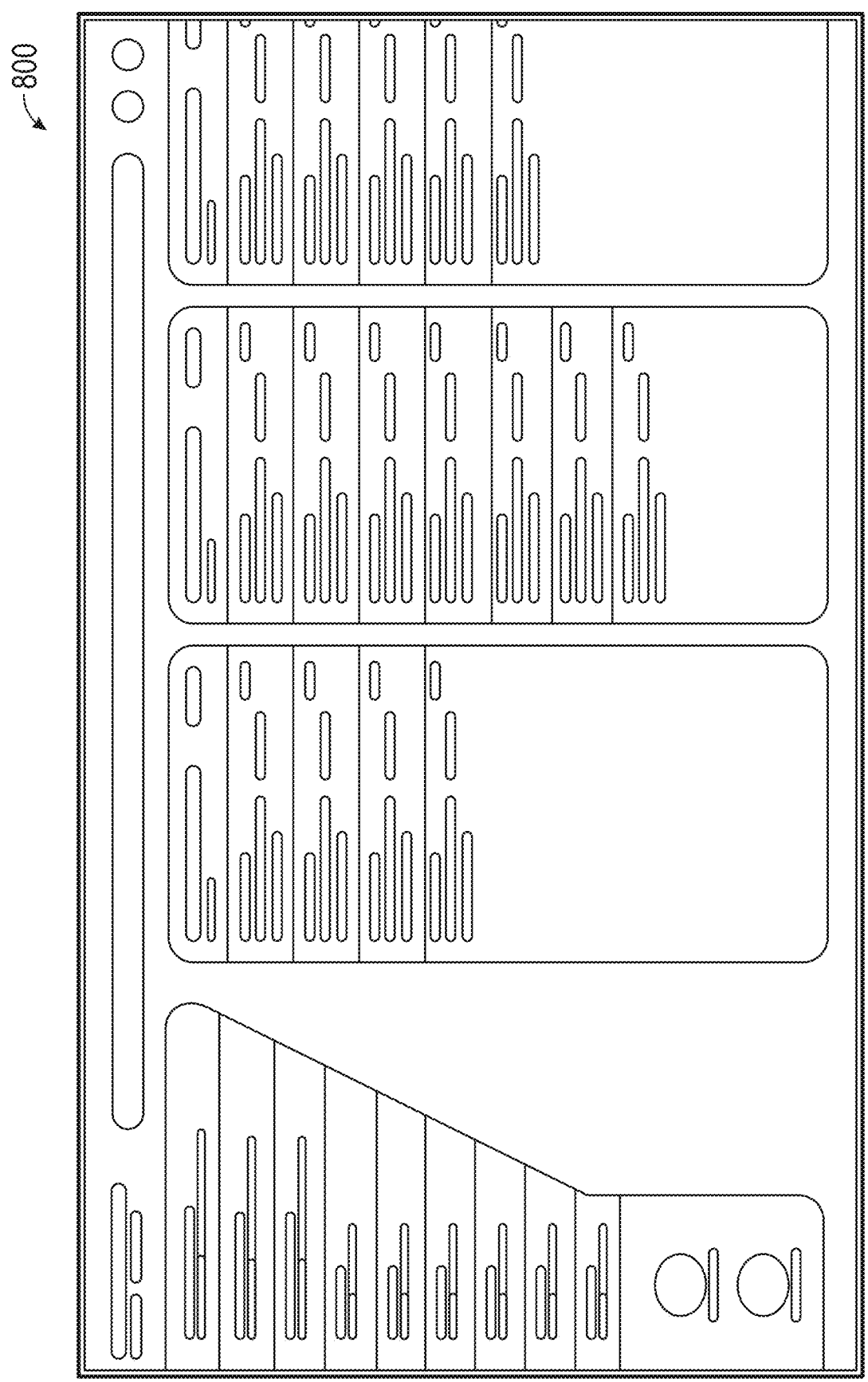
FIG. 8 depicts a screenshot mockup intended to illustrate a funnel type of stage overview.

FIG. 8 depicts a screenshot mockup intended to illustrate a funnel type of stage overview. The shape of the stage overview can be either a plain horizontal bar or funnel shaped as in the figure to increase the visual appeal and aid navigation.

Figure 9:
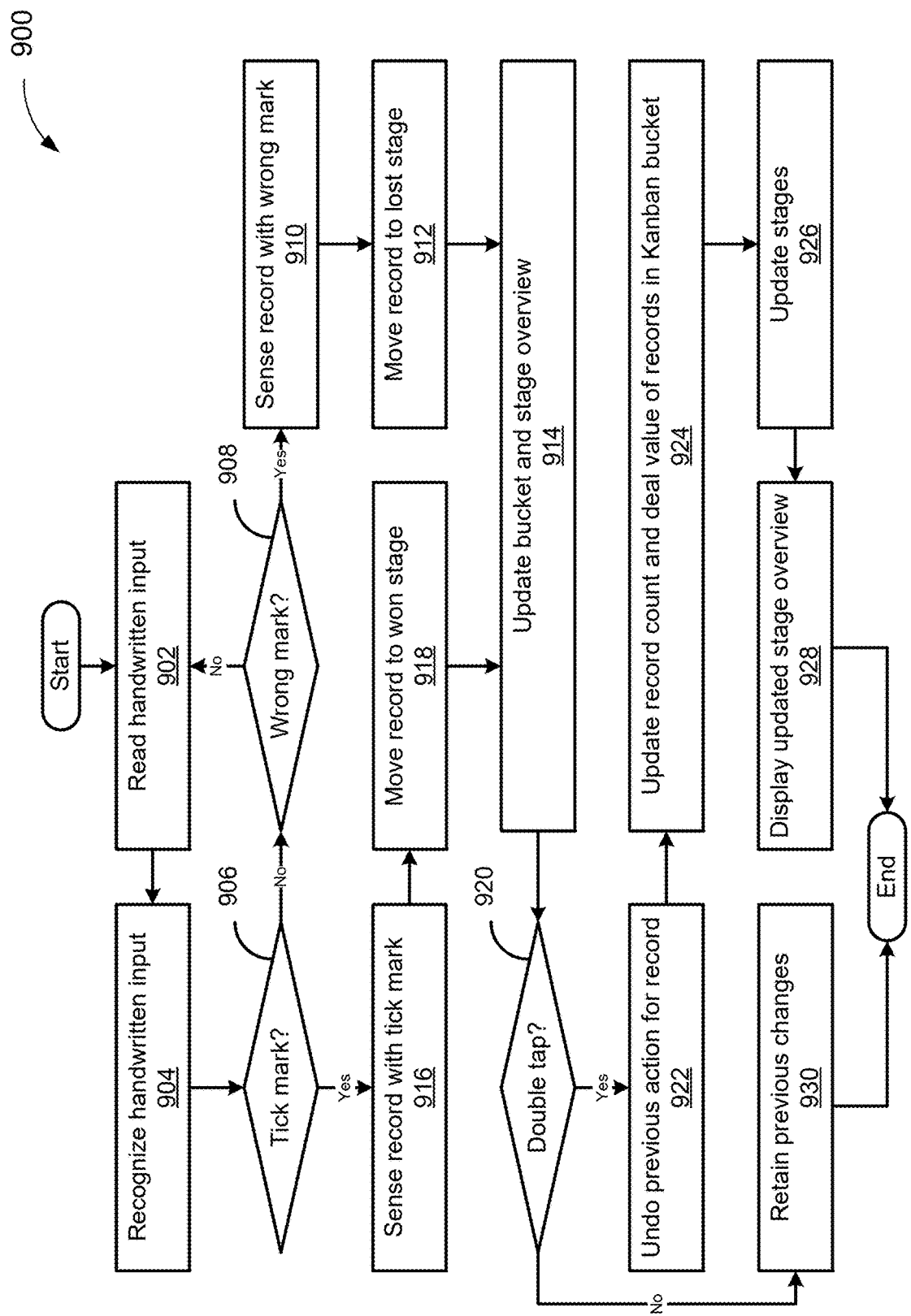
FIG. 9 depicts a flowchart of an example of a method for handwritten input recognition in kanban board and its effect on stage overview.

FIG. 9 depicts a flowchart 900 of an example of a method for handwritten input recognition in kanban board and its effect on stage overview. The flowchart 900 starts at module 902 with reading handwritten input. In a specific implementation, a touchscreen user interface senses a user handwritten input via a stylus pen or finger. Advantageously, data input via stylus pen can be easier and quicker compared to a keyboard when not seated at a desk. Also, the stylus pen has more reach area and the flow of thoughts can be easily pinned down.

The flowchart 900 continues to module 904 with recognizing handwritten input. In a specific implementation, a touchscreen controller recognizes handwritten input given by a user via a user interface, such as the user interface 114 of FIG. 1, and forwards to a kanban board control engine, such as the kanban board control engine 116 of FIG. 1.

The flowchart 900 continues to decision point 906 where it is determined whether the recognized handwritten input is a tick mark. If it is determined the recognized handwritten input is not a tick mark (906—No), then the flowchart 900 continues to decision point 908 where it is determined whether the recognized handwritten input is a wrong mark. If it is determined that the recognized handwritten input is not a wrong mark (908—No), the flowchart 900 returns to module 902 and continues as described previously. In this specific implementation, if any other handwritten input apart from tick or wrong mark is received from the user, then the action is ignored.

If it is determined that the recognized handwritten input is a wrong mark (908—Yes), the flowchart 900 continues to module 910 with sensing a record associated with the wrong mark, to module 912 with moving the associated record to the "lost" stage, and to module 914 with updating bucket and stage overview. If, on the other hand, it is determined the recognized handwritten input is a tick mark (906—Yes), then the flowchart continues to module 916 with sensing a record associated with the tick mark, to module 918 with moving the associated record to the "won" stage, and to module 914.

In either case, the flowchart 900 continues from module 914 to decision point 920 where it is determined whether a double tap has been detected. If it is determined there was a double tap (920—Yes), then the flowchart 900 ends at module 922 with undoing previous action for the record. For example, if the user double taps using the stylus pen, the last performed action is reversed for the record.

If, on the other hand, it is determined that there was no double tap (920—No), then the flowchart 900 continues to module 924 with updating record count and deal value of records in kanban bucket, continues to module 926 with updating stages, and ends at module 928 with displaying updated stage overview. The flowchart 900 ends with the updated stage overview and buckets displayed.

Figure 10:
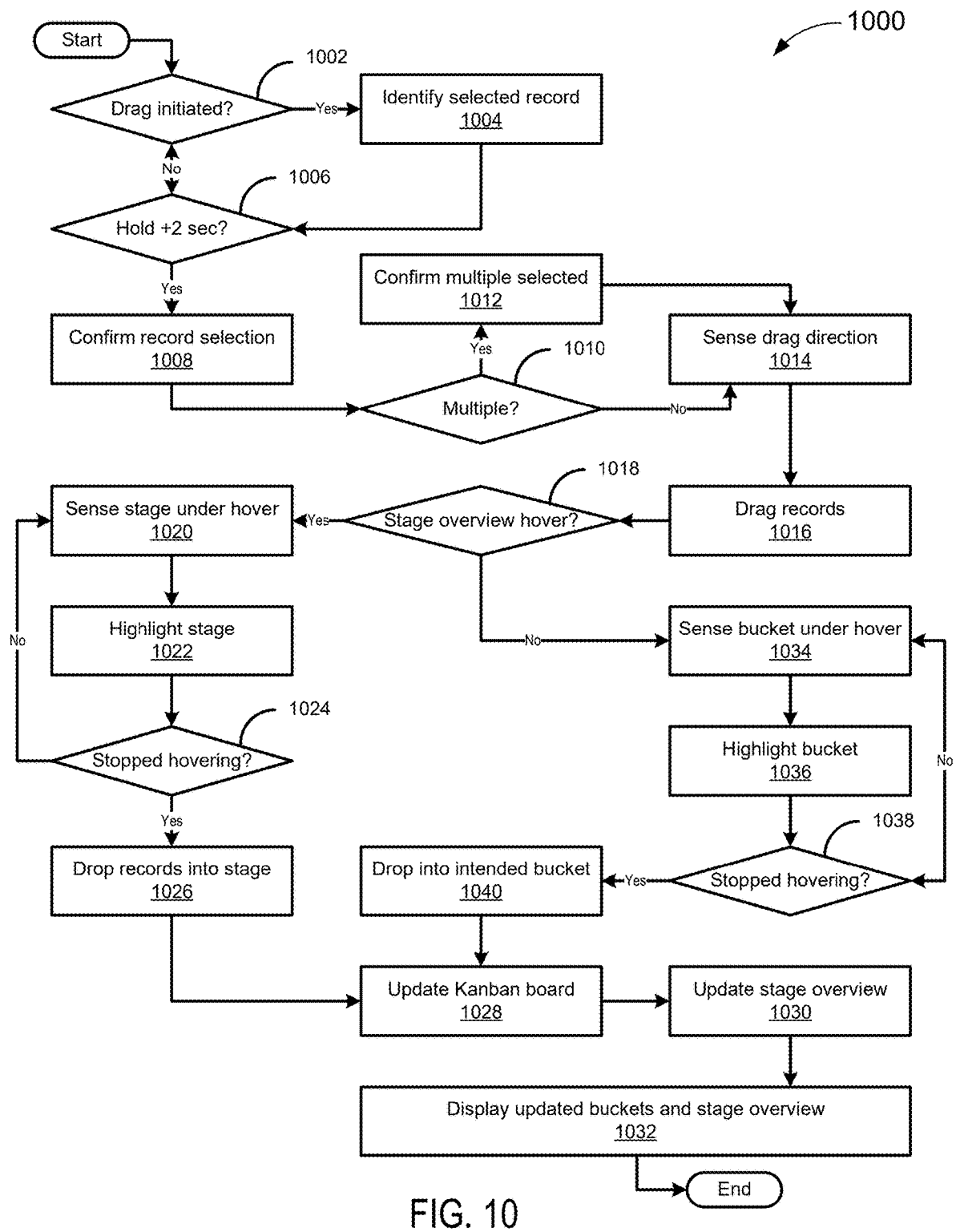
FIG. 10 depicts a flowchart of an example of a method for drag and drop gesture recognition in kanban board and stage overview.

FIG. 10 depicts a flowchart 1000 of an example of a method for drag and drop gesture recognition in kanban board and stage overview. The flowchart 1000 starts at module 1002 with determining whether a drag action has been initiated. In a specific implementation, a touch screen user interface senses a user gesture via a stylus pen or finger. A user interface, such as the user interface 114 of FIG. 1, which in this case includes a touchscreen controller, recognizes gesture as initiating a drag and drop operation. In an alternative, the drag and drop operation could be detected from some other input device, such as a mouse. A kanban board control engine, such as the kanban board control engine 116 of FIG. 1, receives control from the user interface in response to detecting the initiation of the operation.

If it is determined that a drag operation has been initiated (1002—Yes), then the flowchart 1000 continues to module 1004 with identifying the selected record. That is, in this context, the record that is being dragged is identified. If, on the other hand, it is determined that a drag operation has not been initiated (1002—No), then the flowchart 1000 continues to decision point 1006 with determining whether the selection has been held for 2 seconds. Although in this example the predefined holding time for the record selected by the user for dragging is set to 2 seconds, other durations can be used instead. If it is determined that the selection has not been held for 2 seconds (1006—No) or if no drag action was initiated, then the flowchart 1000 returns to decision point 1002 and continues as described previously. For the purposes of this example, if the holding time is not at least equal to 2 seconds, the action is ignored.

If, on the other hand, it is determined that the selection has been held for 2 seconds (1006—Yes), then the flowchart 1000 continues to module 1008 with confirming record selection. For example, if the holding time is equal to 2 seconds, a kanban board control engine, such as the kanban board control engine 116 of FIG. 1, confirms that user has picked a record from a kanban bucket.

The flowchart 1000 continues to decision point 1010 with determining whether the drag action includes multiple records. If it is determined the drag action includes multiple records (1010—Yes), then the flowchart continues to module 1012 with confirming multiple records were selected. After module 1012 or after it is determined the drag action does not include multiple records (1010—No), the flowchart 1000 continues to module 1014 where drag direction is sensed. For example, a kanban board control engine, such as the kanban board control engine 116 of FIG. 1, confirms the user has selected multiple records for the drag operation, either from the same or different buckets, and determines the direction of the drag operation from user input.

The flowchart 1000 continues to module 1016 where the record(s) are dragged in accordance with user input and to decision point 1018 where it is determined whether a hover action is detected in stage overview. For example, a kanban board control engine, such as the kanban board control engine 116 of FIG. 1, can determine whether user input is such that a hover action has been initiated.

If it is that determined a stage overview hover action has been detected (1018—Yes), then the flowchart 1000 continues to module 1020 where the stage under the hover is sensed, to module 1022 where the stage under the hover is highlighted, and to decision point 1024 where it is determined whether the hover action has stopped. If it is determined that the hover action has not stopped (1024—No), then the flowchart 1000 returns to module 1020 and continues as described previously. If, on the other hand, it is determined that the hover action has stopped (1024—Yes), then the flowchart 1000 continues to module 1026 with dropping the record(s) into the stage, to module 1028 with updating the kanban board, to module 1030, with updating the stage overview, and finally to module 1032 with displaying updated buckets and stage overview, where the flowchart 1000 ends. Thus, as the dragged records are dropped into an intended stage, the count of records in the bucket are updated on kanban board and the stages are updated in stage overview, which are displayed.

If, on the other hand, it is determined that a stage overview hover action has not been detected (1018—No), then the flowchart continues to module 1034 with sensing a bucket under the hover, to module 1036 with highlighting the bucket, and to decision point 1038 where it is determined whether the hover action has stopped. If it is determined that the hover action has not stopped (1038—No), then the flowchart 1000 returns to module 1034 and continues as described previously. If, on the other hand, it is determined that the hover action has stopped (1038—Yes), then the flowchart 1000 continues to module 1040 with dropping the record(s) into the intended bucket and to module 1028, where the flowchart 1000 continues as described previously.

With drag and drop, users can drag deals from one onscreen location to another. For example, a user can drag single or multiple records/deals from a bucket at a time and drop it into a stage on stage overview, thereby avoiding the unnecessary navigation across several buckets to reach a specific bucket to drop the record/deal. Advantageously, this reduces scrolling and/or navigation time while simultaneously improving the efficiency of record organization process on the kanban board. In a specific implementation, just a free scroll through the stages listed in the stage overview is enough to drag and drop one or more records on any stage easily.

Figure 15A:
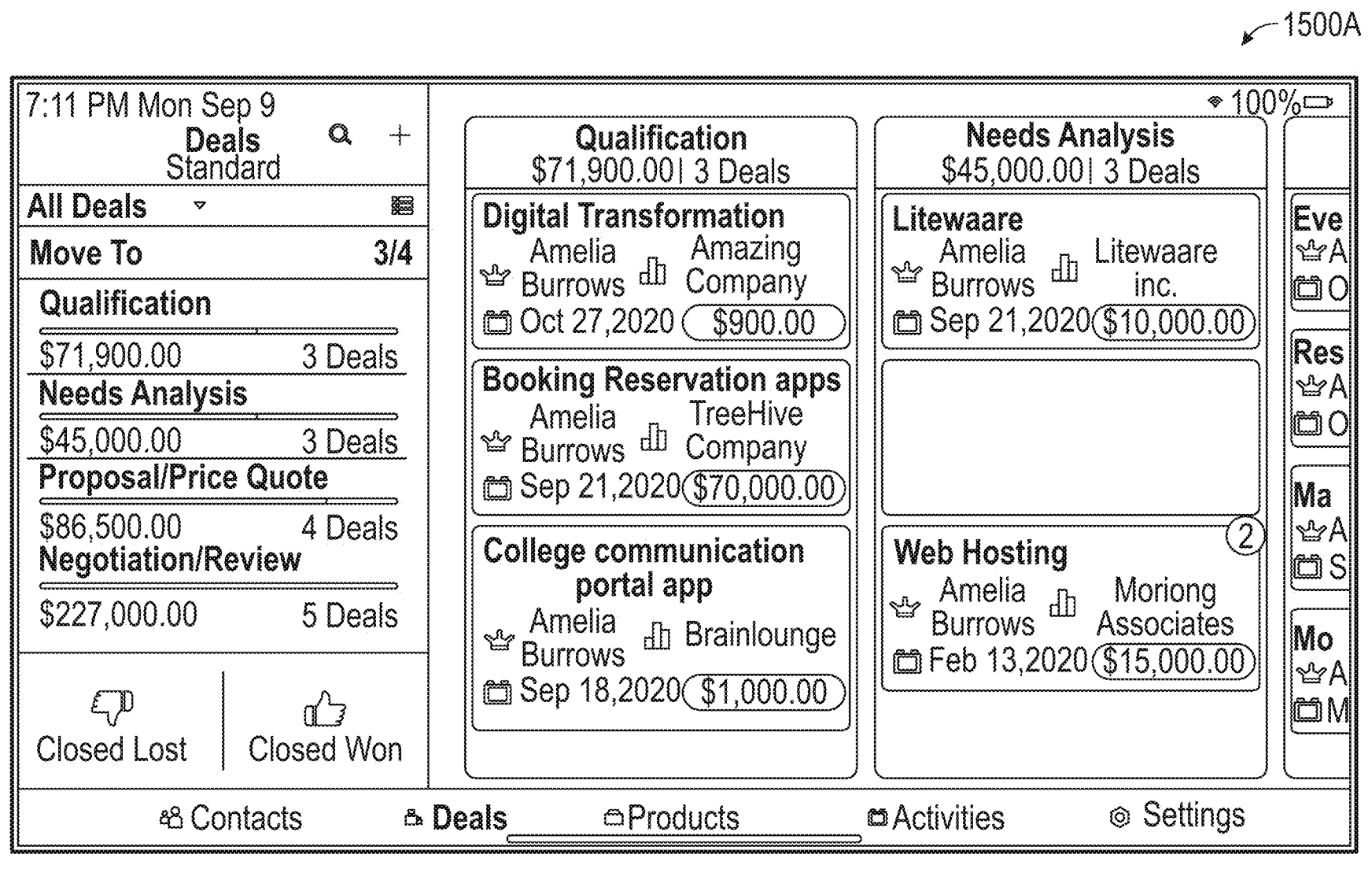
Figure 15B:
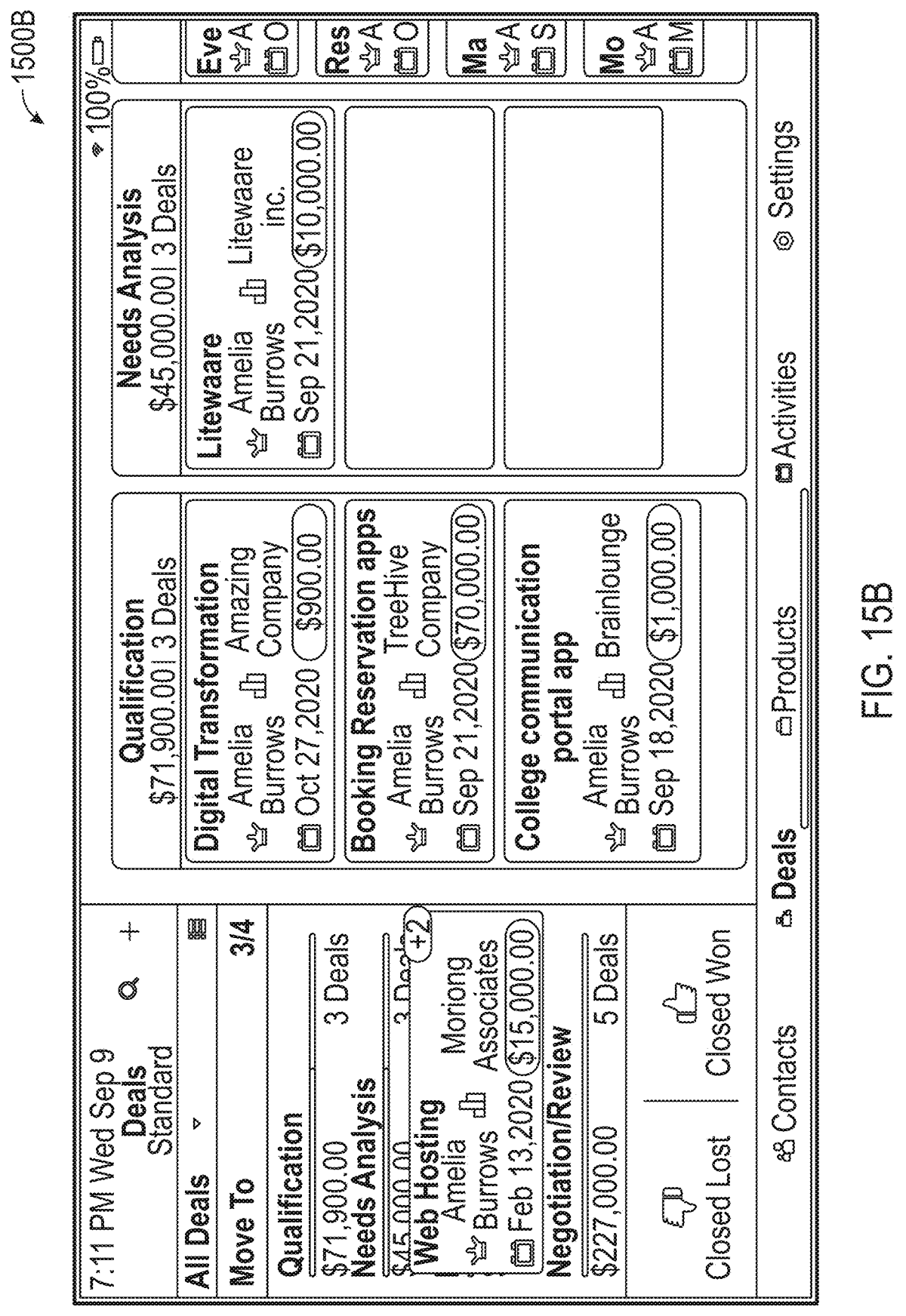

FIGS. 15A and 15B respectively depict dragging a record in Kanban and dropping a record in stage overview.

The invention claimed is:

1. A computer program product comprising a processor and memory with instructions stored thereon for execution by the processor, the instructions when executed causing the processor to perform:

confirming a first stage of a plurality of stages has been selected from a kanban stage overview of a graphical user interface (GUI), wherein the kanban stage overview is segmented as high value records, mid value records, and low value records based on record value or deal value of stages, wherein the kanban stage overview is based on stages in a sales funnel, wherein the kanban stage overview is created based on simultaneous accumulation of the stages in the sales funnel, and wherein a shape of the kanban stage overview includes a funnel shape;

identifying a first bucket of a plurality of buckets mapped with the first stage based on the record value or deal value of the first stage, wherein each of the plurality of buckets represents a respective stage in the sales funnel, and wherein the plurality of buckets include a collection of similar records;

moving the first bucket into a kanban view area of the GUI;

determining whether a hover action is detected over the kanban stage overview of the GUI;

when the hover action is detected, highlighting a second stage of the plurality of stages over which the hover is detected;

determining of the second stage of the plurality of stages has been selected;

following a display pattern when the second stage of the plurality of stages is selected, wherein the second stage is displayed at a farthest end away from the kanban stage overview or is displayed adjacent to the kanban stage overview, and wherein the kanban stage overview is placed either horizontally or vertically;

enabling scrolling horizontally through the plurality of stages in the kanban stage overview when the kanban stage overview is placed horizontally and scrolling vertically through the plurality of stages when the kanban stage overview is placed vertically.

2. The computer program product of claim 1, the instructions when executed causing the processor to perform:
  when the first bucket is in the kanban view area, highlighting the first bucket in the kanban view area;
  when the first bucket is not in the kanban view area, moving the first bucket into the kanban view area.

3. The computer program product of claim 1, the instructions when executed causing the processor to perform:
  determining whether the second stage of the plurality of stages is visible in the kanban stage overview;
  when the second stage is not visible, enabling scrolling through the plurality of stages in the kanban stage overview.

4. The computer program product of claim 1, wherein the kanban stage overview is configurable to be left edge aligned, center aligned, or right edge aligned on the kanban view area.

5. The computer program product of claim 1, wherein the shape of the kanban stage overview includes a horizontal bar, a vertical bar, or a funnel shape.

6. The computer program product of claim 1, the instructions when executed causing the processor to perform navigating to the first bucket by selecting the first stage from the kanban stage overview.

7. The computer program product of claim 1, wherein the kanban stage overview is based on stages in a calendar period.

8. The computer program product of claim 1, the instructions when executed causing the processor to perform:
  performing a drag and drop operation on one or more records to drag the one or more records into the second stage of the plurality of stages and drop the one or more records in the second stage;
  updating a record count in the first bucket in the kanban view area in response to the drag and drop operation;
  updating the plurality of stages in the kanban stage overview in response to the drag and drop operation.

9. The computer program product of claim 8, the instructions when executed causing the processor to perform:
  detecting a double tap gesture;
  reversing the drag and drop operation in response to detecting the double tap gesture.

10. The computer program product of claim 1, the instructions when executed causing the processor to perform:
  recognizing a tick mark gesture;
  performing a move operation on a record associated with the tick mark gesture to move the record into a won stage of the plurality of stages;
  updating the won stage in response to the move operation;
  updating the plurality of stages in the kanban stage overview in response to the move operation.

11. The computer program product of claim 10, the instructions when executed causing the processor to perform:
  detecting a double tap gesture;
  reversing the move operation in response to detecting the double tap gesture.

12. The computer program product of claim 1, the instructions when executed causing the processor to perform:
  recognizing a wrong mark gesture;
  performing a move operation on a record associated with the wrong mark gesture to move the record into a lost stage of the plurality of stages;
  updating the lost stage in response to the move operation;
  updating the plurality of stages in the kanban stage overview in response to the move operation.

13. The computer program product of claim 12, the instructions when executed causing the processor to perform:
  detecting a double tap gesture;
  reversing the move operation in response to detecting the double tap gesture.

14. The computer program product of claim 1, the instructions when executed causing the processor to perform displaying the first bucket associated with the first stage in the kanban view area in response to confirming the first stage has been selected, wherein the first bucket is displayed adjacent to the kanban stage overview or away from the kanban stage overview.

15. The computer program product of claim 1, the instructions when executed causing the processor to perform highlighting the first bucket in the kanban view area in response to confirming the first stage has been selected.

* * * * *